United States Patent
Park et al.

(10) Patent No.: US 11,273,391 B2
(45) Date of Patent: Mar. 15, 2022

(54) OIL-WATER SEPARATOR FOR OIL-CONTAINING RESIDUES

(71) Applicant: KOAI CO. LTD., Busan (KR)

(72) Inventors: Kyung Taek Park, Busan (KR); Chang Hwan Kang, Busan (KR); Seul Gi Ju, Gimhae-si (KR)

(73) Assignee: KOAI CO. LTD.

( * ) Notice: Subject to any disclaimer, the term of this patent is extended or adjusted under 35 U.S.C. 154(b) by 174 days.

(21) Appl. No.: 16/699,506

(22) Filed: Nov. 29, 2019

(65) Prior Publication Data

US 2021/0086104 A1 Mar. 25, 2021

(30) Foreign Application Priority Data

Sep. 23, 2019 (KR) .................. 10-2019-0116864

(51) Int. Cl.
| | | |
|---|---|---|
| *B01D 17/04* | (2006.01) | |
| *B01D 17/02* | (2006.01) | |
| *C02F 1/00* | (2006.01) | |
| *C02F 1/40* | (2006.01) | |
| *B01D 35/30* | (2006.01) | |
| *B01D 35/16* | (2006.01) | |
| *B01D 29/64* | (2006.01) | |
| *B01D 29/13* | (2006.01) | |
| *C02F 101/32* | (2006.01) | |

(52) U.S. Cl.
CPC ....... *B01D 17/045* (2013.01); *B01D 17/0214* (2013.01); *B01D 29/13* (2013.01); *B01D 29/6415* (2013.01); *B01D 35/16* (2013.01); *B01D 35/30* (2013.01); *C02F 1/001* (2013.01); *C02F 1/40* (2013.01); *C02F 2101/32* (2013.01)

(58) Field of Classification Search
CPC .. B01D 17/045; B01D 17/0214; B01D 35/30; B01D 35/16; B01D 29/6415; B01D 29/13; B01D 17/10; B01D 17/02; B01D 17/12; B01D 29/11; B01D 29/6407; B01D 2201/0415; B01D 2201/16; C02F 1/001; C02F 1/40; C02F 2101/32
See application file for complete search history.

(56) References Cited

U.S. PATENT DOCUMENTS

| | | | | |
|---|---|---|---|---|
| 3,690,466 A | * | 9/1972 | Lee .................. | B01D 29/885 210/387 |
| 3,741,389 A | * | 6/1973 | Anderson .......... | B01D 29/09 210/783 |
| 4,861,496 A | * | 8/1989 | Diaz .................. | B01D 35/06 204/544 |

FOREIGN PATENT DOCUMENTS

| | | |
|---|---|---|
| JP | 3208632 B2 | 9/2001 |
| JP | 3728835 B2 | 12/2005 |
| KR | 100999413 B1 | 12/2010 |
| KR | 101670161 B1 | 11/2016 |

(Continued)

*Primary Examiner* — Waqaas Ali
(74) *Attorney, Agent, or Firm* — Renaissance IP Law Group LLP

(57) ABSTRACT

The present inventive concept relates to an oil-water separator for oil-containing residues, including: an outer casing configured to allow residues containing oil and water to be put thereinto; a filter member for separating the oil and the water contained the residues from each other; and a filter support frame coupled to the filter member in such a manner as to be separably seated inside the outer casing, wherein the oil and the water are passed through the filter member at different speeds from each other.

12 Claims, 8 Drawing Sheets

(56) References Cited

FOREIGN PATENT DOCUMENTS

KR 101789070 B1 10/2017

* cited by examiner

A 510  531  532

510  531  532

OIL-WATER SEPARATOR FOR OIL-CONTAINING RESIDUES

CROSS REFERENCE TO RELATED APPLICATION

The present disclosure claims the benefit of Korean Patent Application No. 10-2019-0116864 filed in the Korean Intellectual Property Office on Sep. 23, 2019, the entire contents of which are incorporated herein by reference.

TECHNICAL FIELD

The present inventive concept relates to an oil-water separator for oil-containing residues, and more particularly, to an oil-water separator for oil-containing residues that is capable of performing first filtering for the residues to separate the residues having large particles and then performing second filtering for contaminated water separated from the filtered residues to separate and discharge oil and water contained in the contaminated water, independently of each other.

BACKGROUND

A large amount of waste oil is generated in a kitchen in which a large amount of oil is used to make fried food.

During containers with oil stains are washed, especially, waste water in which oil and sludge are admixed is generated. If high temperature water is used to perfectly remove the oil stains from the containers, at this time, steam is also generated.

If the waste water mixed with oil is drained to a sewage pipe, without any treatment, a complicated and high cost treatment system and a long period of treatment time are needed to dissolve the oil, and if the waste water mixed with oil flows to lakes and rivers in a state where the oil is not dissolved perfectly, serious environmental problems may occur due to eutrophication of lakes and rivers. Further, the drain may be often clogged.

Accordingly, various treatments and devices such as an oil-water separator into which a filter is introduced have been developed to perform oil dissolution or oil separation for waste water mixed with oil.

In case of the oil-water separator using the filter, however, the filter has to be frequently exchanged with new one, which requires continuous cares and high costs for the cares, and even if the filter is not used in the oil-water separator, it is hard to collect the separated oil. If the sludge containing the oil is not collected early, an expected oil separation effect cannot be obtained.

Since a device for collecting the sludge has to be separately placed, further, an installation area of the oil-water separator becomes bulky to cause problems on an installation space and a treatment cost, thereby avoiding a treatment for the waste water mixed with oil or failing to perform the treatment appropriately.

SUMMARY

Accordingly, the present inventive concept has been made in view of the above-mentioned problems occurring in the related art, and it is an object of the present inventive concept to provide an oil-water separator for oil-containing residues that is capable of being simple in structure to achieve compactualization and reduction in a manufacturing cost, minimizing problems on an installation space, and reducing a treatment cost required for oil-water separation.

To accomplish the above-mentioned object, according to the present inventive concept, there is provided an oil-water separator for oil-containing residues, including: an outer casing configured to allow residues containing oil and water to be put thereinto; a filter member for separating the oil and the water contained the residues from each other; and a filter support frame coupled to the filter member in such a manner as to be separably seated inside the outer casing, wherein the oil and the water are passed through the filter member at different speeds from each other.

According to the present inventive concept, desirably, the oil-water separator further includes: a filter hitting part for receiving an external force to hit the filter support frame; and a pedal part for rotating the filter hitting part.

According to the present inventive concept, desirably, the filter hitting part includes hitting means constituted of at least one or more hitting members having a shape of a cam having a given curvature in an outermost shape thereof in such a manner as to be rotated to directly hit the underside of the filter support frame.

According to the present inventive concept, desirably, while an extension direction of the filter support frame and an extension direction of a shaft connected to the hitting means are being disposed in parallel to each other, the hitting means hits the filter support frame.

According to the present inventive concept, desirably, while an extension direction of the filter support frame and an extension direction of a shaft connected to the hitting means are being disposed perpendicular to each other, the hitting means hits the filter support frame.

According to the present inventive concept, desirably, the pedal part includes: a pedal member having a vertical reciprocation motion with the external force applied thereto; and first power transmission means having at least one or more rack gears and at least one or more pinion gears to convert the vertical reciprocation motion of the pedal member into a rotary motion.

According to the present inventive concept, desirably, the pedal part includes: a pedal member having a vertical reciprocation motion with the external force applied thereto; and flow generation means having a link member rotatably connected to the pedal member to convert the vertical reciprocation motion of the pedal member into a linear reciprocation motion and a piston member connected to the link member in such a manner as to be operated by the operation of the pedal member.

According to the present inventive concept, desirably, the oil-water separator further includes a valve part coupled to a through hole formed at the center of the filter member to discharge the oil separated with delay through the filter member to the outside.

According to the present inventive concept, desirably, the valve part includes: a valve unit whose one end is inserted into the through hole of the filter member; a first impact absorbing part made of an elastic material and disposed between an outer periphery of the through hole of the filter member and an outer periphery of one end of the valve unit inserted into the through hole to decrease the external force applied to the valve unit and simultaneously to improve a coupling force between the filter member and one end of the valve unit; and an oil discharge pipe disposed on the other end of the valve unit to discharge the oil to the outside.

According to the present inventive concept, desirably, the valve unit includes an opening and closing lever extended therefrom in such a manner as to be passed through the outer casing so as to adjust an amount of oil discharged to the oil discharge pipe, and the valve part further includes a second impact absorbing part disposed on the outer casing at a position where the opening and closing lever and the outer casing come into contact with each other so as to absorb an impact applied to the valve unit at the time when the opening and closing lever is operated.

According to the present inventive concept, desirably, the oil-water separator further includes a filter cleaning part rotatably disposed in the outer casing in such a manner as to remove foreign matters attached to the filter member to filter the oil and the water at different speeds from each other.

According to the present inventive concept, desirably, the filter cleaning part includes: a cleaning body disposed on top of the filter member in such a manner as to have a shape capable of covering a top periphery of the filter member; at least one or more brush members detachably mounted onto the underside of the cleaning body in such a manner as to be frictional with the top of the filter member; and one pair of handles disposed protruding from the outer periphery of the cleaning body, seated on the top end periphery of the outer casing to allow the cleaning body to be rotatable in the outer casing, and exposed to the outside in such a manner as to be grasped by a user.

According to the present inventive concept, desirably, the outer casing further includes at least one pair of movement guide parts formed to a shape of 'L' on the top end periphery thereof along moving paths of the handles to allow the handles to be rotatable.

According to the present inventive concept, desirably, the cleaning body is formed unitarily with the handles.

BRIEF DESCRIPTION OF THE DRAWINGS

The above and other objects, features and advantages of the present inventive concept will be apparent from the following detailed description of the embodiments of the invention in conjunction with the accompanying drawings, in which.

DETAILED DESCRIPTION

Objects, characteristics and advantages of the present inventive concept will be more clearly understood from the detailed description as will be described below and the attached drawings.

Before the present inventive concept is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present inventive concept in virtually any appropriately detailed structure.

Terms used in this application are used to only describe specific exemplary embodiments and are not intended to restrict the present inventive concept.

An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

All terms used herein, including technical or scientific terms, unless otherwise defined, have the same meanings which are typically understood by those having ordinary skill in the art.

Residues mentioned in the application are constituted of at least two or more selected from sludge (solid), oil, and water.

Figure 1:
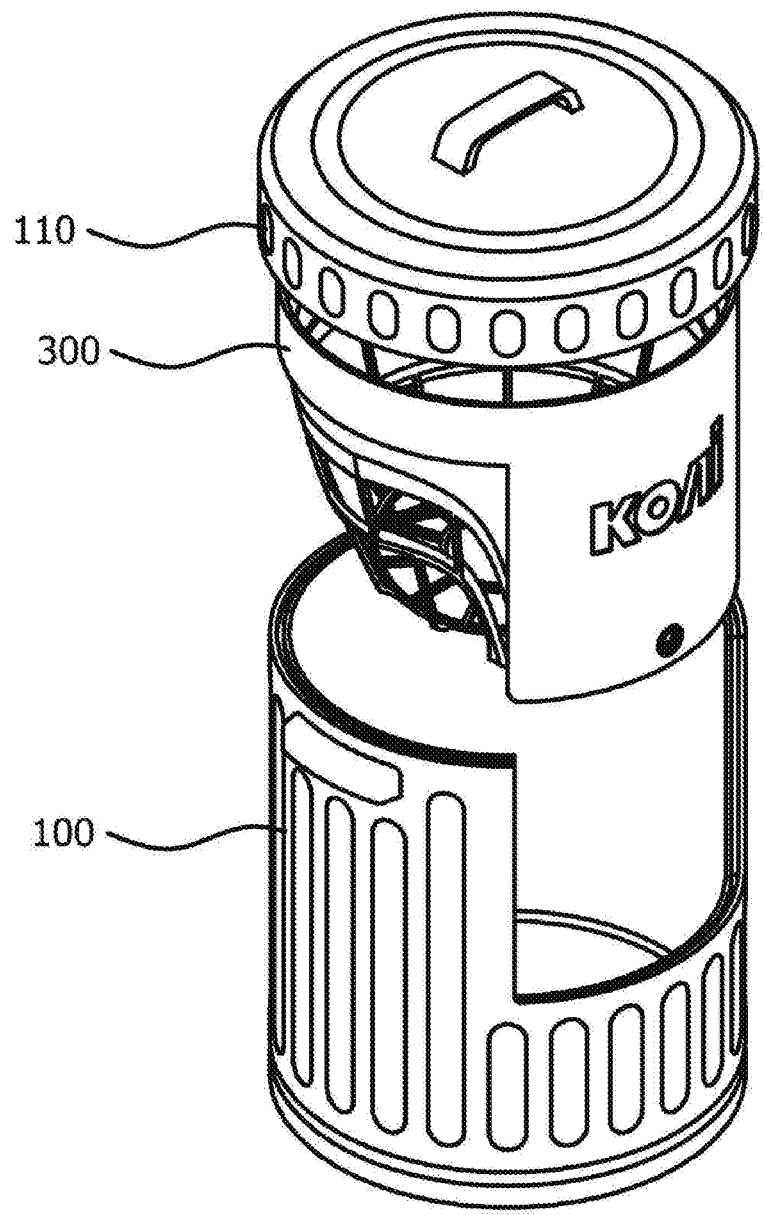
FIG. 1 is a perspective view showing an oil-water separator for oil-containing residues according to a first embodiment of the present inventive concept.

FIG. 1 is a perspective view showing an oil-water separator for oil-containing residues according to a first embodiment of the present inventive concept.

As shown in FIG. 1, an oil-water separator for oil-containing residues according to the first embodiment of the present inventive concept largely includes an outer casing 100 and a filter support frame 300.

In this case, the outer casing 100 is configured to allow residues containing oil and water to be put thereinto.

Desirably, the outer casing 100 includes a cap 110 adapted to seal a top side thereof so as to prevent an odor emitted from the residues from being distributed to the outside.

First, the residues put in the outer casing 100 are separated into oil and water by means of a filter member (not shown).

In this case, the filter member whose outer peripheral surface is subjected to a hydrophilic oil-repellent coating treatment, so that the water is gently passed therethrough, while the oil is being not passed therethrough.

Further, the oil and the water have different degrees of cohesion and different single particle sizes, and accordingly, the oil and the water may be passed through the filter member at different speeds from each other.

Also, the outer casing 100, the filter member, and the filter support frame 300 are separable from each other, thereby cleaning them in a more convenient manner than a food treatment device with a unitary body.

Next, oil-water separators for oil-containing residues according to second and third embodiments of the present inventive concept will be in detail explained with reference to FIGS. 2 to 8.

Figure 2:
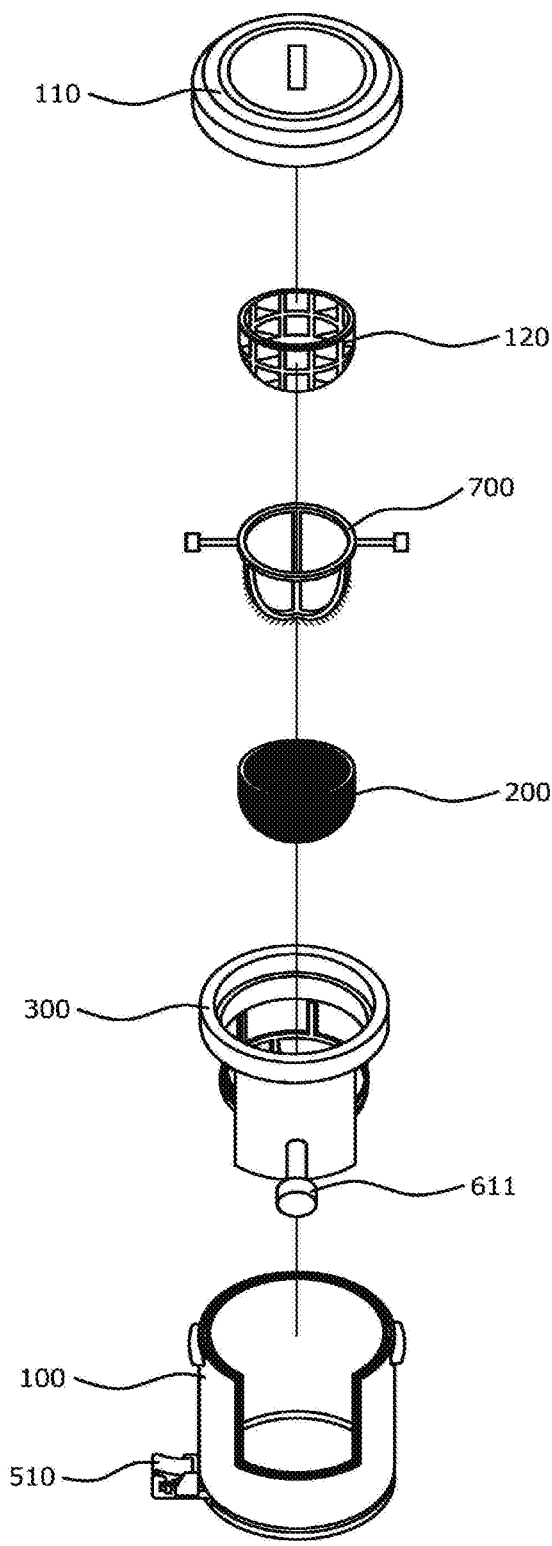
FIG. 2 is an exploded perspective view showing an oil-water separator for oil-containing residues according to a second embodiment of the present inventive concept, wherein a pedal part and a filter cleaning part are provided.
Figure 3:
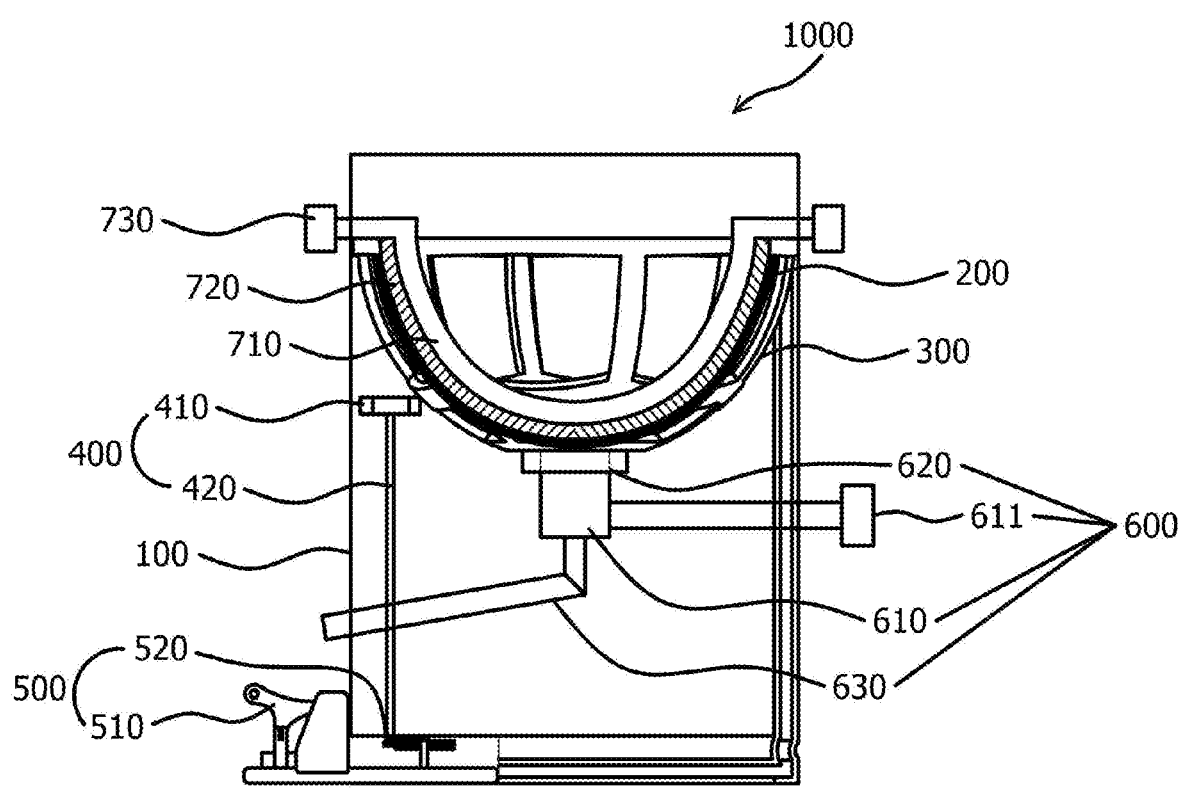
FIG. 3 is a sectional view showing the oil-water separator for oil-containing residues according to a third embodiment of the present inventive concept, wherein a filter hitting part, a pedal part, a filter cleaning part, and a valve part are provided.

FIG. 2 is an exploded perspective view showing an oil-water separator for oil-containing residues according to a second embodiment of the present inventive concept, wherein a pedal part and a filter cleaning part are provided, and FIG. 3 is a sectional view showing the oil-water separator for oil-containing residues according to a third embodiment of the present inventive concept, wherein a filter hitting part, a pedal part, a filter cleaning part, and a valve part are provided.

As shown in FIGS. 2 and 3, an oil-water separator 1000 for oil-containing residues according to the present inventive concept includes an outer casing 100, a filter member 200, a filter support frame 300, a filter hitting part 400, a pedal part 500, and a filter cleaning part 700.

As mentioned above, first, the oil-water separator 1000 is configured to allow the filter member 200 to be seated onto the filter support frame 300 to be coupled to the outer casing 100.

Through the use of the filter member 200, at this time, the oil-water separator 1000 can be simple in structure, thereby improving the easiness in a manufacturing process thereof and reducing a manufacturing cost thereof.

Further, a pre-treatment filter 120 is disposed on top of the filter member 200 to separate sludge contained in the residues, and after the sludge is filtered through the pre-treatment filter 120, accordingly, only the oil and water separated from the sludge of the residues are passed through the filter member 200.

In this case, the filter support frame 300 is seated inside the outer casing 100 in such a manner as to be separated from the outer casing 100 and simultaneously to be coupled to the filter member 200 to support the filter member 200.

Next, an explanation on the filter hitting part of the oil-water separator 1000 according to the third embodiment of the present inventive concept will be in detail given with reference to FIGS. 4A to 6.

Figure 4A:
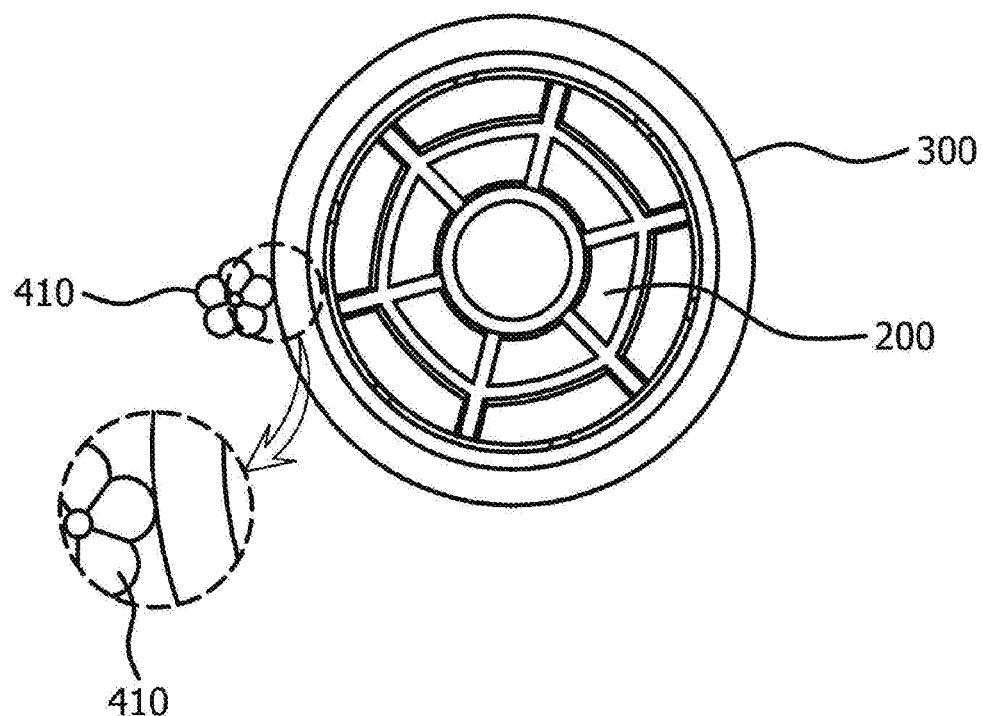
FIGS. 4A and 4B are plan and enlarged views showing the filter support frame, the pedal part, and the filter hitting part of the oil-water separator according to the third embodiment of the present inventive concept.
Figure 4B:
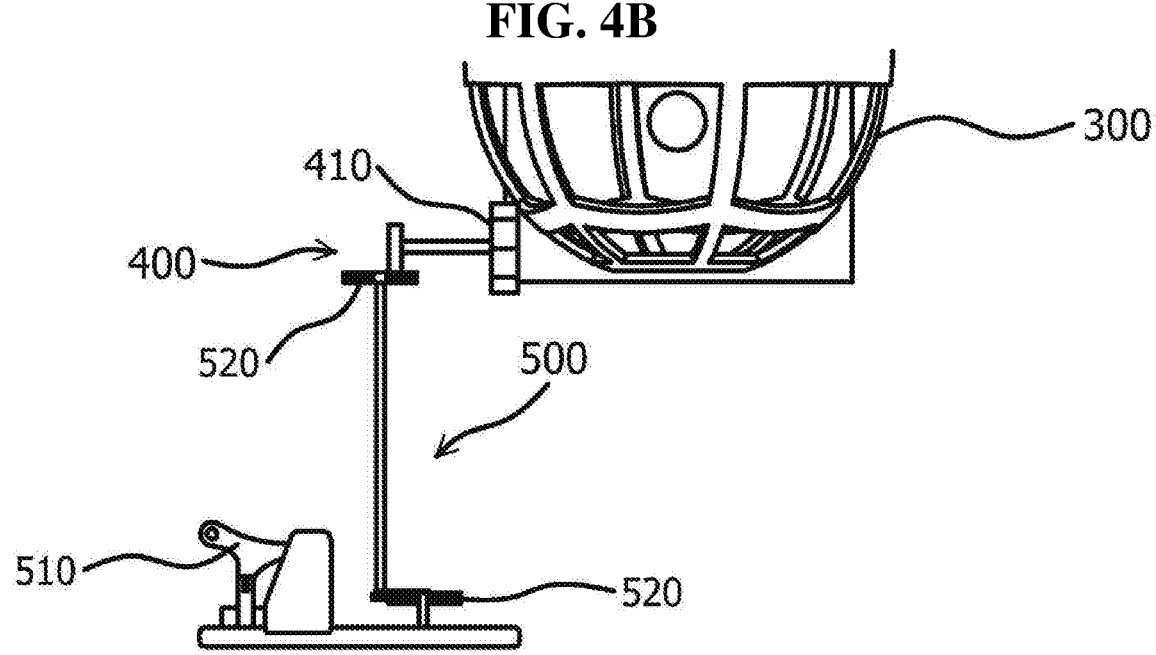
Figure 5:
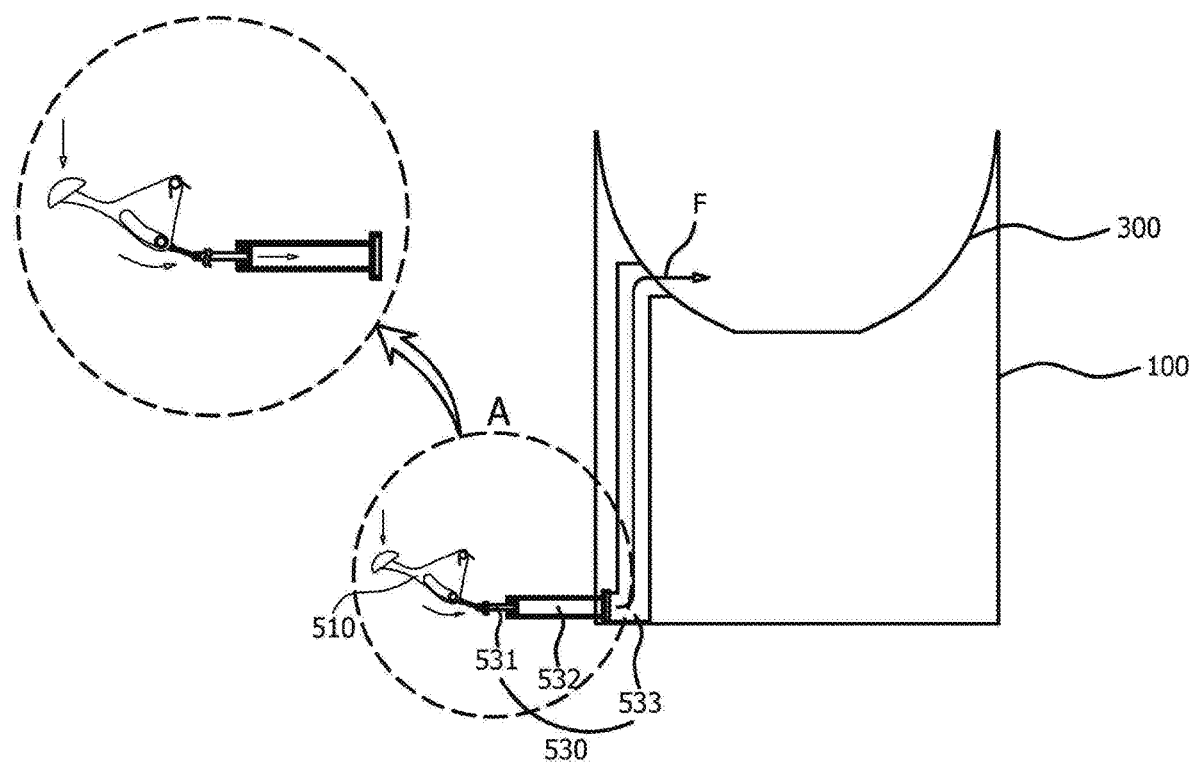
FIG. 5 is a side view showing another example of the filter hitting part of the oil-water separator according to the third embodiment of the present inventive concept.
Figure 6:
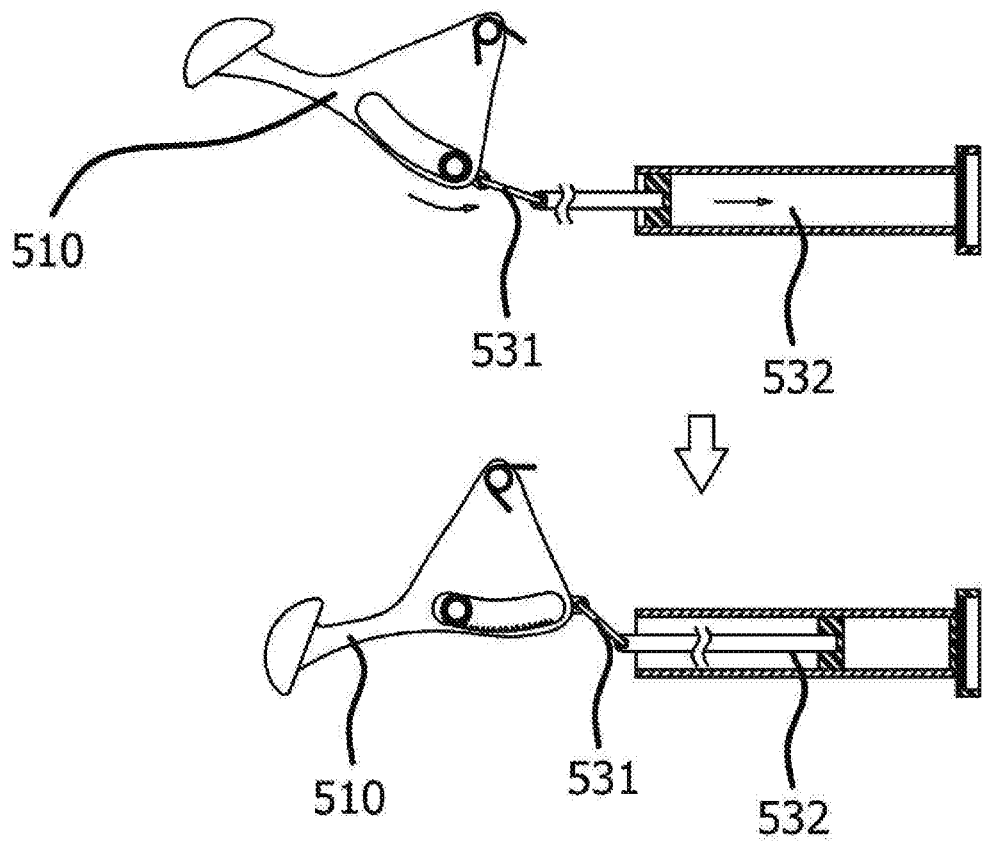
FIG. 6 is a side view showing operating states of the filter hitting part of the oil-water separator according to the third embodiment of the present inventive concept.

FIGS. 4A and 4B are plan and enlarged views showing the filter support frame, the pedal part, and the filter hitting part of the oil-water separator according to the third embodiment of the present inventive concept, FIG. 5 is a side view showing another example of the filter hitting part of the oil-water separator according to the third embodiment of the present inventive concept, and FIG. 6 is a side view showing operating states of the filter hitting part of the oil-water separator according to the third embodiment of the present inventive concept.

As shown in FIGS. 3, 4A and 4B, the oil-water separator according to the third embodiment of the present inventive concept further includes the filter hitting part 400.

In this case, the filter hitting part 400 includes hitting means 410 constituted of at least one or more hitting members having a shape of a cam having a given curvature in an outermost shape thereof in such a manner as to be rotated to directly hit the underside of the filter support frame 300.

Particularly, the hitting means 410 is connected to a shaft 420 connected to the pedal part 500 as will be discussed later, so that when an external force is applied to the pedal part 500, the shaft 420 transfers the external force thereto. As mentioned above, the hitting means 410 is rotated to directly hit the underside of the filter support frame 300.

While an extension direction of the shaft 420 and an extension direction of the filter support frame 300 are being disposed in parallel to each other or perpendicular to each other, at this time, the hitting means 410 hits the filter support frame 300.

As the hitting means 410 hits the filter support frame 300, at this time, oil particles of the residues caught in pores of the filter member 200 can be floated, thereby allowing the filter member 200 to be revived.

If an oil discharge speed is decreased due to the cohesion of the oil during the use of the filter member 200, accordingly, the hitting means 410 is operated to improve the oil discharge speed.

Upon the application of an external force to the filter member 200 so as to improve a filtering efficiency, especially, hitting against the filter support frame 300 is carried out, while direct hitting against the filter member 200 is being minimized, thereby suppressing the filter member 200 from being damaged and broken and ensuring a long life term of the oil-water separator 1000 according to the present inventive concept.

Further, the pedal part 500 includes a first pedal member 510, first power transmission means 520, and flow generation means 530.

In this case, the pedal member 510 is configured to allow an external force to be applied thereto from a user through a vertical reciprocation motion on the outside of the outer casing 100.

Further, the first power transmission means 520 receives the external force applied to the pedal member 510 and has at least one or more rack gears and at least one or more pinion gears.

Even though not shown in the drawing, at this time, the first power transmission means 520 is configured to allow the rack gears to move by means of the vertical reciprocation motion applied to the pedal member 510 and to allow the pinion gears engaging with the rack gears to be rotated by the movement of the rack gears, so that it can perform a linear reciprocation motion.

In detail, the first power transmission means 520 can convert the vertical reciprocation motion of the pedal member 510 into the rotary motion.

Referring to FIG. 6 showing another example of the pedal part 500, further, the pedal part 500 includes the flow generation means 530 having a link member 531, a piston member 532, and a transfer pipe 533.

The link member 531 is rotatably connected to the pedal member 510 in such a manner as to be cooperatively operated with the pedal member 510 to transfer the vertical reciprocation motion of the pedal member 510 to the piston member 532.

Further, the link member 531 receives the external force applied to the pedal member 510 and thus transfers the received external force to the piston member 532 to allow the piston member 532 to be operated.

Accordingly, the piston member 532 is linearly reciprocated to permit a fluid F in the transfer pipe 533 cooperatively operated therewith to be circulated.

Through the circulation of the fluid F in the transfer pipe 533, in this case, the residues where oil and water are mixed can flow, and as the residues flow, the oil temporarily attached to the filter member 200 can be floated upward, thereby improving a filtering efficiency of the filter member 200.

Figure 7:
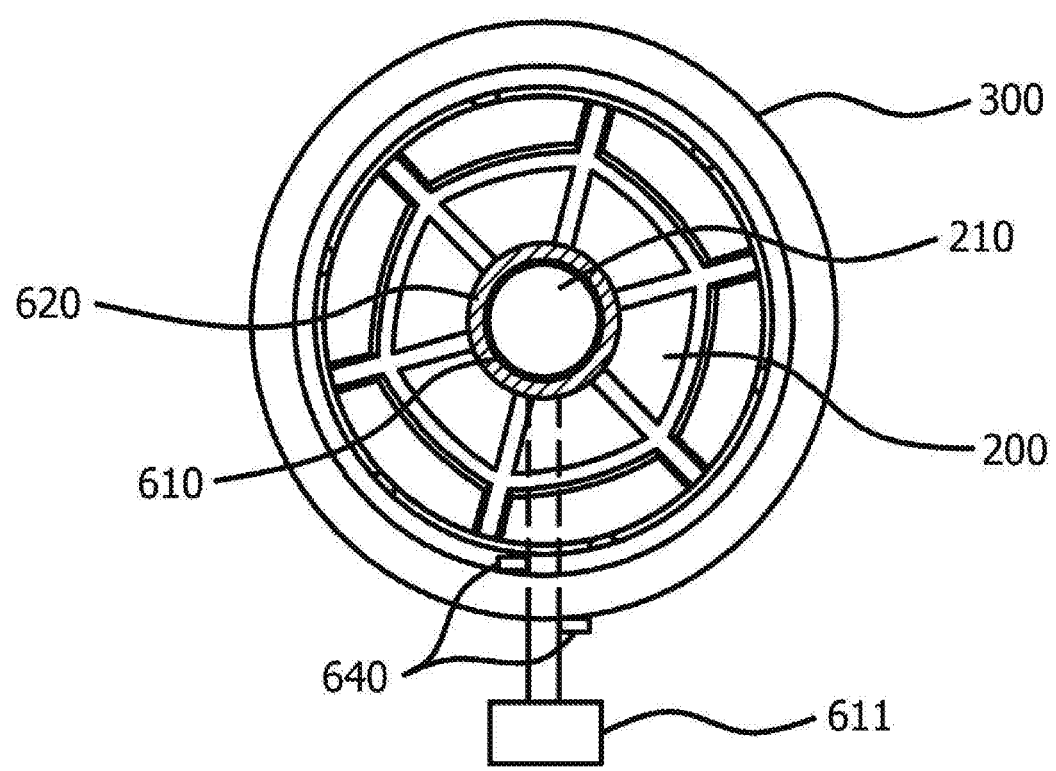
FIG. 7 is a plan view showing the valve part of the oil-water separator according to the third embodiment of the present inventive concept.

Next, an explanation on the valve part 600 of the oil-water separator 1000 according to the third embodiment of the present inventive concept will be in detail given with reference to FIGS. 3 and 7.

FIG. 7 is a plan view showing the valve part of the oil-water separator according to the third embodiment of the present inventive concept.

As shown in FIGS. 3 and 7, the oil-water separator 1000 according to the third embodiment of the present inventive concept further includes the valve part 600 adapted to discharge the oil separated with delay through the filter member 200 to the outside.

In this case, the filter member 200 has a through hole 210 formed at the center thereof in such a manner as to be coupled to the valve part 600.

In this case, the valve part 600 includes a valve unit 610, an opening and closing lever 611, a first impact absorbing part 620, an oil discharge pipe 630, and a second impact absorbing part 640.

As mentioned above, the through hole 210 is formed at the center of the filter member 200, and the valve unit 610 is inserted into the through hole 210.

Also, the oil discharge pipe 630 is disposed on the other end of the valve unit 610 to discharge the oil to the outside.

In detail, the oil discharge pipe 630 is extended from the valve unit 610 in such a manner as to be passed through the outer casing 100 to discharge the oil to the outside of the oil-water separator 1000.

Further, the first impact absorbing part 620 is disposed between an outer periphery of the through hole 210 of the filter member 200 and an outer periphery of one end of the valve unit 610 inserted into the through hole 210.

As a result, the valve part 600 can decrease an external force applied to the valve unit 610 and simultaneously improve a coupling force between the filter member 200 and one end of the valve unit 610.

Further, the first impact absorbing part 620 is made of an elastic material, and at the time when the oil-water separator 1000 is manufactured, the first impact absorbing part 620 is press-fitted to the through hole 210, thereby providing conveniences in a manufacturing process.

Especially, the first impact absorbing part 620 serves to minimize an impact applied to the filter member 200 upon the opening and closing operation of the valve unit 600, thereby ensuring the long life term of the filter member 200.

Further, the valve unit 610 has the opening and closing lever 611 extended therefrom in such a manner as to be passed through the outer casing 100 so as to adjust an amount of oil discharged to the oil discharge pipe 630.

Furthermore, the second impact absorbing part 640 is disposed on the outer casing 100 so as to absorb the impact applied to the valve unit 610 at the time when the opening and closing lever 611 is operated.

In detail, the second impact absorbing part 640 is located at a position where the opening and closing lever 611 and the outer casing 100 come into contact with each other.

Accordingly, the second impact absorbing part 640 serves to prevent the abrasion of the outer casing 100 by the operation of the opening and closing lever 611.

Particularly, the second impact absorbing part 640 serves to minimize an impact applied to the outer casing 100, at the time when the valve part 600 performs the opening and closing operation through the opening and closing lever 611, thereby ensuring the long life term of the filter member 200.

Through the valve part 600, accordingly, the durability of the oil-water separator 1000 can be maintained, and also, the oil can be separately discharged to the outside, so that oil and water separation time can be freely adjusted on the outside, thereby enhancing conveniences and cleanness in use.

Figure 8:
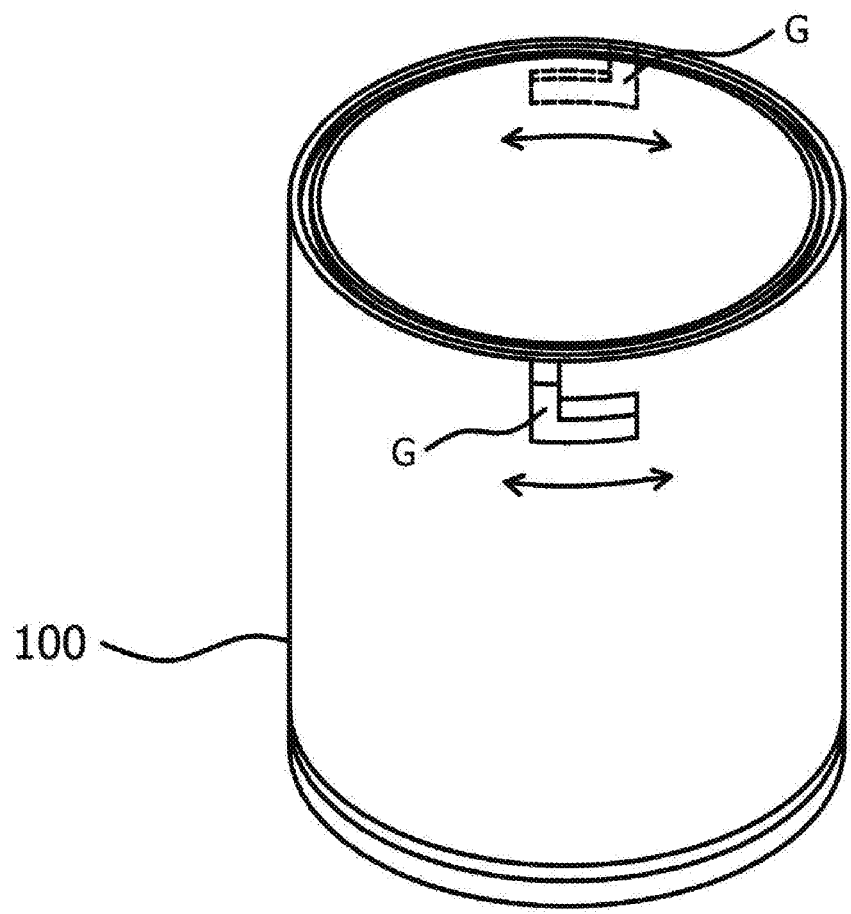
FIG. 8 is a perspective view showing movement guide parts formed on the outer casing of the oil-water separator according to the third embodiment of the present inventive concept.

Next, an explanation on the filter cleaning part 700 of the oil-water separator 1000 will be in detail given with reference to FIGS. 3 and 8.

FIG. 3 is a sectional view showing the oil-water separator for oil-containing residues according to the third embodiment of the present inventive concept, wherein the filter cleaning part is provided, and FIG. 8 is a perspective view showing movement guide parts formed on the outer casing of the oil-water separator according to the third embodiment of the present inventive concept.

As shown in FIG. 3, the filter cleaning part 700 includes a cleaning body 710, brush members 720, and handles 730.

First, the cleaning body 710 is disposed on top of the filter member 200 in such a manner as to cover a top periphery of the filter member 200 and to seat the pre-treatment filter filtering the residues thereonto.

At least one or more brush members 720 are detachably mounted onto the underside of the cleaning body 710 in such a manner as to be frictional with the top of the filter member 200.

In detail, the brush members 720 are disposed on the outer peripheral surface of the cleaning body 710 so as to allow the oil and water separated from the residues to be passed through the cleaning body 710.

As mentioned above, one pair of handles 730 is facingly disposed protruding from the outer periphery of the cleaning body 710 in such a manner as to be seated on the top end periphery of the outer casing 100 to allow the cleaning body 710 to be rotatable in the outer casing 100.

Also, the handles 730 are exposed to the outside so that they can be grasped by the user.

If it is desired that the oil floating on the filter member 200 is rapidly discharged, accordingly, the handles 730 are rotated along the outer periphery of the outer casing 100, so that the cleaning body 710 is rotated to efficiently clean the filter member 200.

Through the filter cleaning part 700, especially, the foreign matters or oil attached to the filter member 200 can be floated and separated from the filter member 200, thereby preventing the filtering efficiency for the attached oil from being decreased and performing oil and water separation more efficiently.

In this case, the outer casing 100 further includes a pair of movement guide parts G adapted to allow the handles 730 to be rotatable.

In more detail, the movement guide parts G are formed to a shape of 'L' on the top end periphery of the outer casing 100 along the moving paths of the handles 730, so that the handles 730 are rotated within a given range in a state of being seated onto the movement guide parts G.

Through the movement guide parts G, especially, the escape of the handles 730 from the outer casing 100 can be prevented, thereby allowing the filter cleaning part 700 to be stably operated by means of the handles 730.

As described above, the oil-water separator according to the present inventive concept is configured to allow oil particles and water particles having different cohesion and signal particle sizes from each other to be passed through the filter member at different speeds from each other and to be simple in structure, thereby improving easiness in a manufacturing process thereof and reducing a manufacturing cost thereof.

Also, the oil-water separator according to the present inventive concept is configured to allow direct hitting against the filter support frame to be carried out, upon the application of an external force to the filter member so as to improve a filtering efficiency, while direct hitting against the filter member is being minimized, thereby suppressing the filter member from being damaged and broken and ensuring a long life term thereof.

Further, the oil-water separator according to the present inventive concept is configured to allow the hitting members having a shape of a cam to hit the filter support frame in such a manner as to apply hitting against the filter support frame repeatedly and periodically, thereby permitting oil particles of the residues caught in pores of the filter member to be floated to revive the filter member.

Moreover, the oil-water separator according to the present inventive concept is configured to have the pedal part adapted to produce a driving force for the hitting members and having the pedal member to which an external force is applied and the power transfer means having the rack gears and the pinion gears, so that it can be simple in structure, thereby improving the easiness in a manufacturing process and a maintenance efficiency.

In addition, the oil-water separator according to the present inventive concept is configured to have the valve part adapted to discharge the oil separated with delay through the filter member to the outside, so that oil and water separation time can be freely adjusted on the outside, thereby enhancing conveniences and cleanness in use.

Also, the oil-water separator according to the present inventive concept is configured to have the impact absorbing part adapted to minimize the impact applied to the filter member during the opening and closing operation of the valve part, thereby ensuring the long life term of the filter member.

Furthermore, the oil-water separator according to the present inventive concept is configured to have the filter cleaning part adapted to clean the filter member in such a manner as to allow the foreign matters, that is, oil attached to the filter member to be floated and separated from the filter member, thereby preventing the filtering efficiency for the attached oil from being decreased and performing the oil and water separation more efficiently.

While the present inventive concept has been described with reference to the particular illustrative embodiments, it is not to be restricted by the embodiments but only by the appended claims. It is to be appreciated that those skilled in the art can change or modify the embodiments without departing from the scope and spirit of the present inventive concept.

What is claimed is:

1. An oil-water separator for oil-containing residues, the separator comprising:
   an outer casing configured to allow residues containing oil and water to be put thereinto;
   a filter member for separating the oil and the water contained the residues from each other;
   a filter support frame coupled to the filter member in such a manner as to be separably seated inside the outer casing; and
   a valve part coupled to a through hole formed at the center of the filter member to discharge the oil separated with delay through the filter member to the outside,
   wherein the oil and the water are passed through the filter member at different speeds from each other,
   wherein the valve part comprises:
   a valve unit whose one end is inserted into the through hole of the filter member;
   a first impact absorbing part made of an elastic material and disposed between an outer periphery of the through hole of the filter member and an outer periphery of one end of the valve unit inserted into the through hole to decrease the external force applied to the valve unit and simultaneously to improve a coupling force between the filter member and one end of the valve unit; and
   an oil discharge pipe disposed on the other end of the valve unit to discharge the oil to the outside.

2. The oil-water separator according to claim 1, further comprising:
   a filter hitting part for receiving an external force to hit the filter support frame; and
   a pedal part for rotating the filter hitting part.

3. The oil-water separator according to claim 2, wherein the filter hitting part comprises hitting means constituted of at least one or more hitting members having a given curvature in an outermost shape thereof in such a manner as to be rotated to directly hit the underside of the filter support frame.

4. The oil-water separator according to claim 3, wherein while an extension direction of the filter support frame and an extension direction of a shaft connected to the hitting means are being disposed in parallel to each other, the hitting means hitting the filter support frame.

5. The oil-water separator according to claim 3, wherein while an extension direction of the filter support frame and an extension direction of a shaft connected to the hitting means are being disposed perpendicular to each other, the hitting means hitting the filter support frame.

6. The oil-water separator according to claim 2, wherein the pedal part comprises:
   a pedal member having a vertical reciprocation motion with the external force applied thereto; and
   first power transmission means having at least one or more rack gears and at least one or more pinion gears to convert the vertical reciprocation motion of the pedal member into a rotary motion.

7. The oil-water separator according to claim 2, wherein the pedal part comprises:
   a pedal member having a vertical reciprocation motion with the external force applied thereto; and
   flow generation means having a link member rotatably connected to the pedal member to convert the vertical reciprocation motion of the pedal member into a linear reciprocation motion and a piston member connected to the link member in such a manner as to be operated by the operation of the pedal member.

8. The oil-water separator according to claim 1, wherein the valve unit comprises an opening and closing lever extended therefrom in such a manner as to be passed through the outer casing so as to adjust an amount of oil discharged to the oil discharge pipe, and the valve part further comprises a second impact absorbing part disposed on the outer casing at a position where the opening and closing lever and the outer casing come into contact with each other so as to absorb an impact applied to the valve unit at the time when the opening and closing lever is operated.

9. The oil-water separator according to claim 1, further comprising a filter cleaning part rotatably disposed in the outer casing in such a manner as to remove foreign matters attached to the filter member to filter the oil and the water at different speeds from each other.

10. The oil-water separator according to claim 9, wherein the filter cleaning part comprises:
    a cleaning body disposed on top of the filter member in such a manner as to cover a top periphery of the filter member;

at least one or more brush members detachably mounted onto the underside of the cleaning body in such a manner as to be frictional with the top of the filter member; and one pair of handles disposed protruding from the outer periphery of the cleaning body, seated on the top end periphery of the outer casing to allow the cleaning body to be rotatable in the outer casing, and exposed to the outside in such a manner as to be grasped by a user.

11. The oil-water separator according to claim 10, wherein the outer casing further comprises at least one pair of movement guide parts (G) formed to a shape of '⌐' on the top end periphery thereof along moving paths of the handles to allow the handles to be rotatable.

12. The oil-water separator according to claim 10, wherein the cleaning body is formed unitarily with the handles.

\* \* \* \* \*